(12) United States Patent
St.Clair

(10) Patent No.: US 6,513,799 B2
(45) Date of Patent: Feb. 4, 2003

(54) AUTOMATIC CALIBRATION METHOD FOR A SUSPENDED SEAT SYSTEM

(75) Inventor: Kenneth A. St.Clair, Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/839,032

(22) Filed: Apr. 20, 2001

(65) Prior Publication Data

US 2002/0011699 A1 Jan. 31, 2002

Related U.S. Application Data

(60) Provisional application No. 60/199,067, filed on Apr. 20, 2000.

(51) Int. Cl.$^7$ .............................. F16F 1/00; G06F 17/00
(52) U.S. Cl. .......................................... 267/131; 701/49
(58) Field of Search ................................ 267/131, 136, 267/132; 248/550; 701/49, 37

(56) References Cited

U.S. PATENT DOCUMENTS

| | | | |
|---|---|---|---|
| 3,807,678 A | | 4/1974 | Karnopp et al. |
| 4,204,255 A | * | 5/1980 | Cremer .......................... 701/49 |
| 4,638,982 A | * | 1/1987 | Misher et al. .............. 267/131 |
| 4,821,849 A | | 4/1989 | Miller |
| 4,881,172 A | | 11/1989 | Miller |
| 4,887,699 A | | 12/1989 | Ivers et al. |
| 4,936,425 A | | 6/1990 | Boone et al. |
| 5,276,623 A | | 1/1994 | Wolfe |
| 5,652,704 A | | 7/1997 | Catanzarite |
| 5,712,783 A | | 1/1998 | Catanzarite |
| 5,732,370 A | * | 3/1998 | Boyle et al. ................. 267/136 |
| 5,958,020 A | * | 9/1999 | Evoy et al. ..................... 710/3 |
| 5,964,455 A | | 10/1999 | Catanzarite et al. ......... 267/131 |
| 6,049,746 A | | 4/2000 | Southward et al. |

* cited by examiner

*Primary Examiner*—Jack Lavinder
*Assistant Examiner*—Thomas J. Williams
(74) *Attorney, Agent, or Firm*—Michael M. Gnibus

(57) ABSTRACT

A method for automatically calibrating a seat suspension system. The method comprises the steps of sensing a current seat position; updating the value of a first current endstop to equal the current seat position if the seat position value is greater than a current first endstop limit; updateing the value of a current second endstop limit to equal the current seat position if the sensed seat position is less than the current second endstop limit; determining if the current first endstop limit is greater than the stored first endstop limit; determining if the current second endstop limit is less than the stored second endstop limit; and if the current first endstop limit is greater than the stored first endstop limit, setting the stored first end stop limit equal to the current first endstop limit, and if the current second endstop limit is less than the stored second endstop limit setting the stored second endstop limit equal to the current second endstop limit.

18 Claims, 2 Drawing Sheets

AUTOMATIC CALIBRATION METHOD FOR A SUSPENDED SEAT SYSTEM

CROSS REFERENCE

Figure 1A:
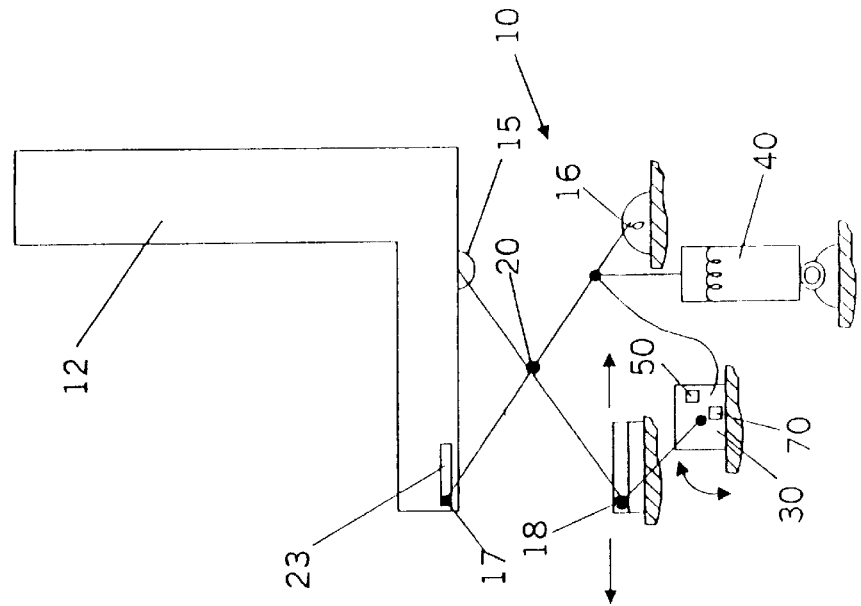

This application claims the benefit of Provisional application serial no. 60/199,067 filed Apr. 20, 2000.

FIELD OF THE INVENTION

The invention generally relates to a method for calibrating a suspended seat system, and more particularly the invention relates to a method for automatically calibrating a suspended seat system by continuously updating maximum and minimum system endstop limits during use of the system.

BACKGROUND OF THE INVENTION

Various methods have been employed to control vibration in seat suspension systems. Generally, in such prior art control methods operating conditions are obtained by at least one sensor which supplies system operating information to a processor that determines the appropriate primary control signal to be sent to an electro-mechanical device such as a magnetorheological (MR) fluid damper, for controlling vibration. A number of the various prior art methods for controlling vibration are described in the following issued United States patents: "Skyhook Control" as described in U.S. Pat. No. 3,807,678 to Karnopp et al.; "Relative Control" as described in U.S. Pat. No. 4,821,849 to Miller; "Observer Control" as described in U.S. Pat. No. 4,881,172 to Miller; "Continuously Variable Control" as described in U.S. Pat. No. 4,887,699 to Ivers et al.; "Delayed Switching Control" as described in U.S. Pat. No. 4,936,425 to Boone et al.; "Displacement Control" as described in U.S. Pat. No. 5,276,623 to Wolfe; "Rate Control" as described in U.S. Pat. No. 5,652,704 to Catanzarite; "Modified Rate Control" as described in U.S. Pat. No. 5,712,783 to Method for Auto-Calibration of a Controllable Damper Suspension System as described U.S. Pat. No. 5,964,455 to Catanzarite.

Seats used in large vehicles such as buses and trucks for example require suspension systems to limit the discomfort felt by the vehicle driver as a result of rough or uneven road conditions. Such suspension systems generally include an electro-mechanical device, such as a controllable orifice damper, magnetorheological damper or electrorheological damper, which is attached between two relatively moveable members. The device's damping is controlled to minimize vibration, but also to avoid endstop collisions. For example, in a controllable damper suspension system, a variable damper is attached between two relatively moveable system components, such as a vehicle chassis and suspension or alternatively, between a vehicle seat and a structural body. One or more sensors provide information regarding the movement of the components of the system, for example, relative or absolute displacement, velocity or acceleration. The damping characteristics of the damper are then controlled in accordance with any of the aforementioned primary control methods. The control may also include an overriding end stop control method such as "Endstop Control Method" described in U.S. Pat. No. 6,049,746 to Southward et al.

Under certain conditions, some or all of these primary control methods will result in abrupt collisions with the end stops (hereinafter referred to as "end stop collisions"). An end stop collision occurs when the mechanical system in which the damper is connected hits the end stop, for example the maximum mechanical limits of the extension and/or rebound strokes when a sufficient transient load is encountered. If the system velocity is high enough when the end stop collision occurs, a very rapid impact can occur. The bottoming and topping out at an end stop condition imparts unwanted stresses to the mechanical components in the system and such collisions can be an annoyance to the driver. More significantly, when a driver or other seat occupant experiences endstop collisions, such collisions can effect the physical health of the seat occupant.

In order for controlled seat suspension systems to work properly the systems must be calibrated before they are installed for use in a particular application. Typically suspension system calibration is performed in the factory immediately after the seat is assembled. Current calibration methods are time consuming and complicated. In an effort to maintain high factory productivity, technicians do not always perform seat calibration and seats occasionally leave the factory without being calibrated yielding a poorly functioning system that is prone to end stop collisions.

One calibration method requires one or more electrical components to be electrically connected to the suspension system before executing the calibration procedure. The electrical component might be a shorting block or three-way jumper. The seat is then manually raised to the top of its travel to the top endstop and is lowered to the bottom of its travel to the bottom endstop. The endstop positions are stored in controller memory. Finally, the one or more electrical components are removed from the suspension system. Although not comprised of many steps, the foregoing prior art calibration method is time consuming and imparts a factory cost to the seat assembly process.

The calibration method disclosed in U.S. Pat. No. 5,964,455 cited hereinabove requires a means for raising and lowering the suspended seat during the calibration procedure in order to determine the upper and lower travel limits of the system. Execution of this calibration method is required for each seat because the seat suspension system is not functional until the system is calibrated. This prior art calibration system includes an auto-leveling device that controls airflow to the seat suspension and as a result the seat suspension height may be adjusted either manually by the driver or automatically by the calibration system. Using the auto-leveling device, the calibration routine is initiated by holding the auto-leveling switch in the up position. Once ready, the calibration routine raises the seat to the upper endstop, and stores the upper endstop position in controller memory. The seat is then moved to the lower endstop and the lower endstop is stored in controller memory. The seat is then moved to a calculated midheight position and is ready to be shipped to a customer. Although seat suspension systems were regularly calibrated using this method, the valving required to actuate the auto-leveling system greatly increased the cost of the suspension system.

The foregoing illustrates limitations known to exist in present devices and methods. Thus, it is apparent that it would be advantageous to provide an alternative calibration method directed to overcoming one or more of the limitations set forth above. Accordingly, a suitable alternative is provided including features more fully disclosed hereinafter.

SUMMARY OF THE INVENTION

In one aspect of the present invention, this is accomplished by providing an automatic calibration method for a seat suspension system. The method comprises the steps of sensing a current seat position; updating the value of a first current endstop to equal the current seat position if the seat position value is greater than a current first endstop limit; updating the value of a current second endstop limit to equal the current seat position if the sensed seat position is less than the current second endstop limit; determining if the current first endstop limit is greater than the stored first endstop limit; determining if the current second endstop limit is less than the stored second endstop limit; and if the current first endstop limit is greater than the stored first endstop limit, setting the stored first end stop limit equal to the current first endstop limit, and if the current second endstop limit is less than the stored second endstop limit setting the stored second endstop limit equal to the current second endstop limit.

The foregoing and other aspects will become apparent from the following detailed description of the invention when considered in conjunction with the accompanying drawing figures.

BRIEF DESCRIPTION OF THE DRAWING FIGURES

Figure 1B:
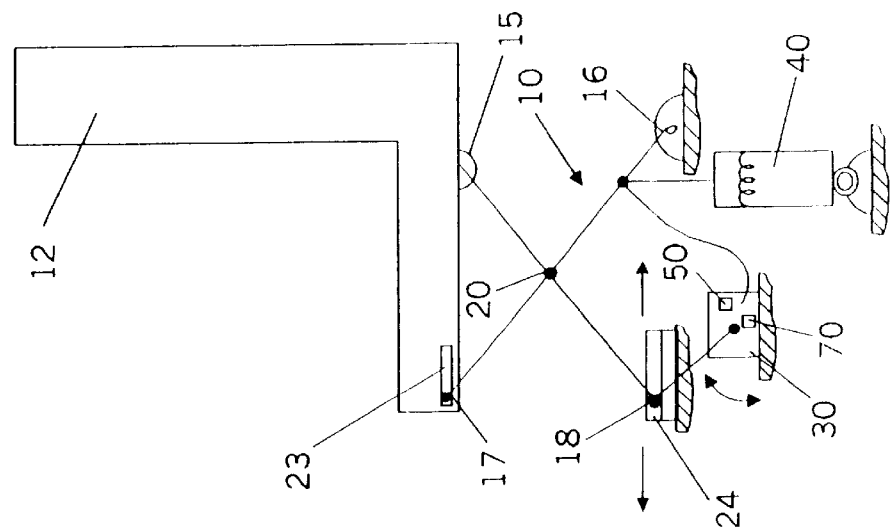
Figure 1C:
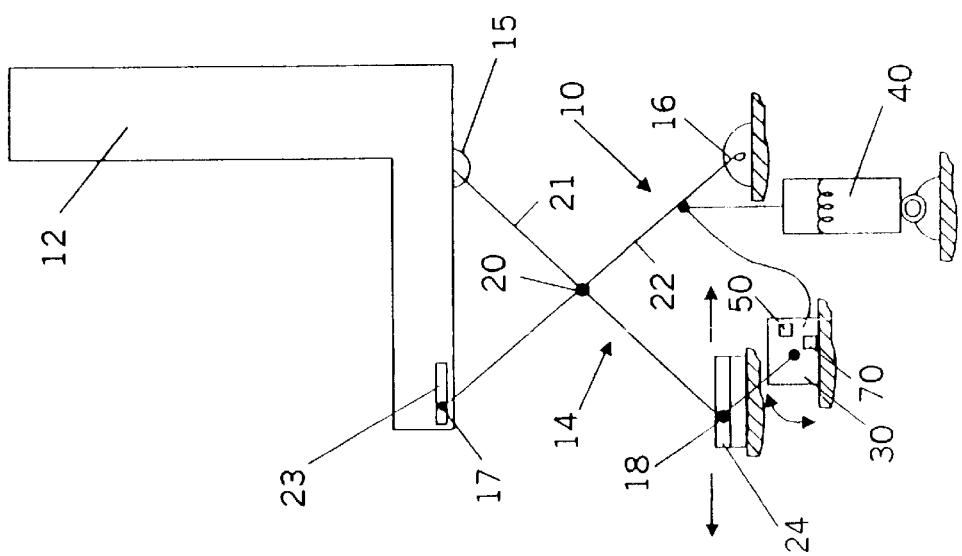

FIGS. 1a, 1b, and 1c are schematic representations of a seat suspension system that utilizes the calibration method of the present invention, with the seat suspension system at maximum and minimum limits and at position between the maximum and minimum limits.

Figure 2:
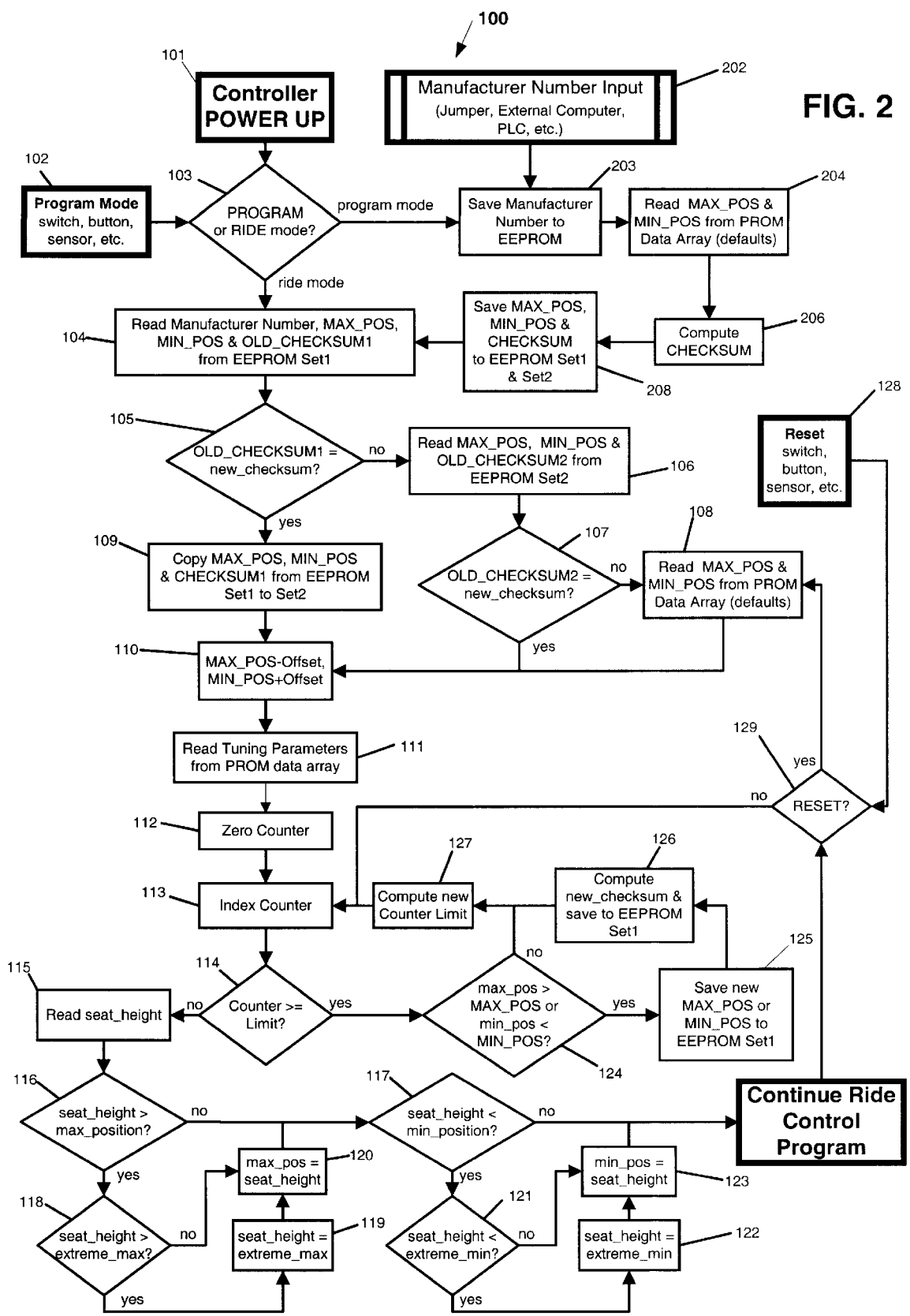

FIG. 2 is a flow chart representation illustrating the integration of the method steps of the calibration system of FIG. 1 into a main seat control routine.

DETAILED DESCRIPTION

Now turning to the drawings wherein like parts are referred to by the same numbers in the several views, the autocalibration method of the present invention shown in FIGS. 1 and 2, tracks the location of the maximum and minimum endstop limits for suspension system 10 which supports seat 12 which might be a truck seat for example. The suspension system serves to eliminate travel to the endstop limits and thereby provide a more comfortable ride to the driver or passenger seated in seat 12. The endstop is the end of permissible movement by the seat.

The seat 12 includes a mechanical multibar linkage 14 with first and second links 21 and 22 shown in FIGS. 1a–c. The linkage is shown in FIGS. 1a–c is shown in two-dimensions for illustrative purpose, and it should be understood that the linkage includes additional members not shown in the Figures. The linkage 14 is exemplary and it should also be understood that the linkage may be comprised of any suitable means for movable joining the seat and suspension system. The links 21 and 22 include respective fixed location ends 15 and 16 typically rotatably fixed at the back of the seat, and linearly moveable ends 17 and 18 at the front of the seat. See FIGS. 1a–1c. The linearly movable ends of links move in a fixed linear path or track 23 and 24 and the rotatable ends 15 and 16 are fixed by a conventional connection that permits the ends 15 and 16 to be rotatable displaced. A pivotal connection 20 joins the links 21 and 22 and other members (not shown) comprising the linkage 14. The mechanical linkage is of conventional design well known to one skilled in the art and therefore further description of the linkage is not required.

A conventional position sensor 30 is connected to link 21 and serves to sense the position of the link 21, and the position sensor is electrically connected to controller 70 which in turn is connected to conventional magnetorheological (MR) damper 40. The damper 40 is connected to link 22. A conventional microprocessor based controller 70 for processing the sensor signals and actuating the autocalibration method of the present invention may be located in the same control housing as sensor 30 as shown in FIGS. 1a, 1b, and 1c. The controller is electrically connected to the memory 50. However the controller and sensor may be discrete components that are not collocated in the same housing. The damper serves to limit the displacement of the seat during operation. The electrical signals are supplied to the damper during system operation to provide damping sufficient to prevent the system from reaching the maximum and minimum endstop limits.

The autocalibration method of the present invention serves to automatically and regularly relearn and identify the maximum and minimum endstop limits of the system. By providing floating limits for the maximum and minimum endstops, the driver experiences a more comfortable ride. The method provides for real time continuous tracking of endstop locations also referred to as the endstop envelope.

Turning now to FIG. 2, and the automatic calibration method 100 of the present invention, initially, when the system is powered up in Step 101 for example by turning the ignition, the initial maximum and minimum endstop limits, respectively MAX_POS and MIN_POS, are read from a data array stored in non-volatile memory referred to by those skilled in the art as Electrically Erasable Programmable Read Only Memory (EEPROM). Generally the non-volatile memory may be any suitable memory that is non-volatile and that may also be read from and written to. This memory may also include flash type memory. The calibration system 100 may remain on even when the vehicle is off.

In Step 103 it is determined if the routine 100 is in the program mode or if it is in the ride mode. If seat manufacturer information needs to be entered or changed the routine enters the Program Mode and if no such addition or modification is required the routine proceeds to Ride Mode Step 104 as previously described. An operator may switch to the Program Mode by actuating a switch, button or sensor for example in Step 102 before Power Up Step 101. The Program Mode may be entered if the type of seat combined with system 10 is changed after the system is installed.

The system may be reset at any time during execution of routine 100. The system may be reset at Step 128 by actuating a switch, button or sensor. When the system is reset, in Steps 129 and 108 the corresponding manufacturer values of MAX_POS and MIN_POS are read from a data array in memory 50 and the routine is reinitialized. The system may be reset if the type of seat remains the same but is re-installed or a new seat of the same type is installed. The system may also be reset after manufacturing or testing the system.

The data array that is read in Step 104 also includes information regarding the type of seat to be supported by system 10. In this way the seat suspension system 10 may be customized to suitable stiffness and endstop values to suit the unique dimensions associated with a specific manufacturers'seat. Turning now to the Steps of the Program Mode, the manufacturer information may be entered in Step 202 of FIG. 2. The manufacturer information may be entered by using any suitable well known device including but not limited to, a serial link to another computer, by switching a jumper or dip switch or by using a Programmable Logic Controller (PLC). In Step 203, a user assigned manufacturer code including any combination of symbols, numbers or letters is saved in memory 50 and the code indicates the type of seat that will be combined with system 10. The manufacturer code is then used to obtain the required endstop limits to support the seat. The endstop limit information associated with various seats is burned or otherwise entered into conventional Programmable Read Only Memory (PROM) that is made integral with the controller 70. Typically the endstop data is loaded into PROM before the system is assembled with the seat 12. The corresponding endstop information is read from PROM after the manufacturer identification number is entered. See Step 204.

A CHECKSUM value is calculated in Step 206. The CHECKSUM value is defined as the sum of the maximum and minimum endstop values. Two identical data sets comprising the endstop values MAX_POS, MIN_POS and the CHECKSUM value are stored in memory 50 in Step 208. During execution of Routine 100 only one of the data sets at a time is open and in use by the routine 100. If during use one of the data sets becomes corrupted through a power failure or other event, routine 100 will retrieve the non-corrupted data set After Step 208 the routine 100 returns to Step 104 in the Ride Mode.

In Step 104, the values of MAX_POS, MIN_POS and OLD_CHECKSUM1 are read from the first data set stored in memory 50. In Step 105 the routine 100 checks to determine if the values in the retrieved data set have been corrupted. In Step 105 the newly calculated new_checksum value is compared with the data set OLD_CHECKSUM1 value. If the OLD_CHECKSUM1 value from data set 1 is equal to the new_checksum value, the routine continues to Step 109.

If however, the two values are not deemed equal in Step 105, the routine proceeds to Step 106 where data set 2 is retrieved from memory 50. The second data set includes CHECK_SUM2, MAX_POS and MIN_POS values stored in Step 208. The value of CHECK_SUM from the second data set is compared to the new_checksum value in Step 107 and if the two are deemed to be equal, the routine proceeds to step 110. If the two values are not deemed equal in Step 107, the values of MAX_POS and MIN_POS for the previously entered manufacturer are obtained from PROM in Step 108 in the manner described in connection with the execution of Step 204. The routine then returns to Step 110.

If in Step 105 the OLD_CHECKSUM1 and new_checksum values are deemed to be equal, the MAX_POS, MIN_POS and OLD-CHECKSUM1 values are copied from data set 1 to data set 2 in Step 109 and then the routine proceeds to Step 110. The value of new_checksum is stored in volatile random access memory (RAM).

In Step 110, a small initial offset may be added to MIN_POS and subtracted from MAX_POS. In this way the damper stroke is decreased. By integrating the offset in this manner, the endstop envelope is decreased to account for small system changes over time. The integration of the offset value is undetectable by the rider of the suspended seat 12. Over time, during execution of routine 100 the damper stroke may be extended to its value before the Offset values were included.

In Step 111 the tuning parameters for the manufacturer's seat are read from a data array stored in previously described PROM. The tuning parameters provide guidance for how the system 10 should dynamically function as the damper approaches its endstop. For a seat with a short stroke, the damper typically needs to be decelerated quickly as the endstop is approached while a seat with a long stroke typically is decelerated more gradually as it approaches the end stop because the damper with a long stroke has a greater stopping distance than one with a limited active stroke.

In Step 112 a counter is set to zero. Each time the routine loops the counter is indexed. See Step 113. If the counter has not exceeded its limit is Step 114 the system reads the seat height in Step 115. Because most non-volatile memory chips like memory 50 have a finite number of write cycles, the counter is used to ensure the number of write cycles over an expected controller lifetime is not exceeded. As a result, during the first six minutes of operation the system 100 checks for a non-volatile memory update every 1.3 seconds. The after six minutes, for one hour the system checks for updates of memory 50 every six minutes and then after the initial hour and six minutes of operation the system 100 only checks for non-volatile memory updates every hour. In this way the number of write cycles to memory 50 is limited. This represents one of many possible scenarios for controlling the frequency of write cycles to memory 50.

In Step 115 the seat height or device position is read from the position sensor 30. The position sensor reads the position of device link 21 approximately 900 times per second and based on the position of the link determines the height of the seat.

In Step 116, if the seat_height does not exceed the current maximum seat position stored in RAM, then in Step 117, the routine 100 determines if the seat—height is less than the current value of the minimum position of the seat stored in RAM. If the seat_height is not less than the minimum position value stored in RAM, the system does not require a calibration update and the counter is again indexed in Step 113.

Returning to Step 116, if the sensed seat_height value is greater than the current value of the maximum position of the seat stored in volatile Random Access Memory (RAM), the routine proceeds to Step 118 to determine if the seat_height is greater than an extreme_maximum seat height value read from a data array stored in PROM and saved in RAM in Step 111. If seat_height is greater than the value of the extreme_maximum seat height stored in RAM, the value of seat_height is set equal to the value of extreme_maximum seat height in Step 119 and the value of maximum_position is set equal to seat_height in Step 120 and the new value of maximum_position is stored in RAM. If in Step 118 seat_hieght is not greater than the value of extreme_maximum, then the routine proceeds to Step 120 and the value of maximum_position is then set equal to seat_height and is stored in RAM.

In Step 117, if the value of seat_height is less than the value of minimum_position saved in RAM, and in Step 121 the value of seat_hieght is less than the extreme minimum value read from a data array stored in PROM and saved in RAM then seat_hieght is set equal to the extreme_minimum value in Step 122. Then in Step 123, the value of minimum_position is updated and set equal to seat height and is stored in RAM. If in Step 121, the value of seat_hieght is not less than the extreme-minimum value read from a data array stored in PROM then the value of minimum_position is set equal to seat_height in Step 123 and is saved in RAM.

The counter is indexed each time Steps 113–123 are executed by routine 100. Once the counter has reached a predetermined limit value, in Step 114, the routine determines if either the value of maximum_position or minimum_position saved in RAM is respectively greater than MAX_POS or less than MIN_POS saved in memory 50. The system is recalibrated and the values of MAX_POS and MIN_POS are updated and set equal to the saved current values of maximum_position and minimum_ position in Step 125. These values are saved as data set 1 in EEPROM 50. In Step 126 a new value of CHECKSUM1 is calculated based on the MAX_POS and MIN_POS values and is saved to memory 50. Finally, in Step 127 a new counter limit is computed.

If neither the maximum_position value is greater than the value of MAX_POS nor the minimum_position value is less than the value of MIN_POS then calibration is not required and the routine does not update the values of MAX_POS and MIN_POS in Step 125 but rather proceeds directly to Step 127. The limit is updated to control the frequency of the write cycles to memory 50.

By the present invention the endstop envelope is continuously monitored and controlled to ensure that the system 10 is at all times accurately calibrated to ensure a comfortable ride to the seat occupant by eliminating harmful endstop collisions.

While I have illustrated and described a preferred embodiment of my invention, it is understood that this is capable of modification, and I therefore do not wish to be limited to the precise details set forth, but desire to avail myself of such changes and alterations as fall within the scope of the following claims.

What is claimed is:

1. In a suspension system for a seat having a seat position sensor, a stored first endstop limit and a stored second endstop limit, a current first endstop limit and a current second endstop limit, a method for automatically calibrating the suspension system, the method comprising the steps of:
   (a) reading first and second stored endstop limits from a data array;
   (b) sensing a current seat position;
   (c) updating the value of the current first endstop limit to equal the current seat position if the seat position value is greater than the current first endstop limit;
   (d) updating the value of the current second endstop limit to equal the current seat position if the current seat position is less than the current second endstop limit;
   (e) determining if the current first endstop limit is greater than the stored first endstop limit;
   (f) determining if the current second endstop limit is less than the stored second endstop limit; and
   (g) if the current first endstop limit is greater than the stored first endstop limit, setting the stored first end stop limit equal to the current first endstop limit, and if the current second endstop limit is less than the stored second endstop limit setting the stored second endstop limit equal to the current second endstop limit.

2. The method for automatically calibrating a seat suspension system as claimed in claim 1 wherein the first stored endstop limit is a maximum seat height and the second stored endstop limit is a minimum seat height.

3. The method for automatically calibrating a seat suspension system as claimed in claim 2 wherein the stored endstop limit values are stored in non-volatile memory.

4. The method for automatically calibrating a seat suspension system as claimed in claim 2 wherein the current seat position is stored as either a current minimum position or as a current maximum position in volatile memory.

5. The method for automatically calibrating a seat suspension system as claimed in claim 3 wherein the non-volatile memory is EEPROM.

6. The method for automatically calibrating a seat suspension system as claimed in claim 4 wherein the volatile memory is RAM.

7. The method for automatically calibrating a seat suspension as claimed in claim 1 wherein method comprises the following steps before step (b): determining if the sensed current seat position is greater than the current first endstop limit and if the seat height is greater than the current first endstop limit the method comprising the following additional steps: determining if the sensed seat position is greater than a predetermined extreme maximum value and if the seat position is greater than the extreme maximum setting the seat position equal to the predetermined extreme maximum and then setting the current first endstop limit value equal to the seat position.

8. The method for automatically calibrating a seat suspension as claimed in claim 1 wherein the method comprises the additional step of calculating a new checksum value.

9. The method for automatically calibrating a seat suspension as claimed in claim 8 wherein checksum is equal to the sum of the first and second endstop limit values.

10. The method for automatically calibrating a seat suspension system as claimed in claim 1, the method comprising the step of applying an offset value to the stored first and second endstop limits.

11. The method for automatically calibrating a seat suspension as claimed in claim 10 wherein the offset is subtracted from the stored first endstop limit and is added to the stored second endstop limit.

12. The method for automatically calibrating a seat suspension system as claimed in claim 1, further comprising the step of reading tuning parameters from a data array to determine a deceleration required as the system approaches either the stored first or second endstop limit.

13. The method for automatically calibrating a seat suspension as claimed in claim 1 wherein an old checksum value is read from a data array, the method comprising the additional step of calculating a new checksum value.

14. The method for automatically calibrating a seat suspension as claimed in claim 13, the method comprising the additional step of determining if the old checksum value is equal to the new checksum value.

15. The method for automatically calibrating a seat suspension as claimed in claim 1 wherein the method comprises a Ride Mode and a Program Mode.

16. The method for automatically calibrating a seat suspension as claimed in claim 15 wherein the Program Mode comprises the step of entering a manufacturer code.

17. The method for automatically calibrating a seat suspension as claimed in claim 16 wherein the method comprises the additional step of retrieving values for the stored first and second endstop limits after the manufacturer code is entered.

18. The method for automatically calibrating a seat suspension as claimed in claim 1 wherein method comprises the following steps before step (b): determining if the seat position is less than the current second endstop limit and if the seat position is less than the current second endstop limit the method comprising the additional steps of: determining if the seat position is less than a predetermined extreme minimum value and if the seat position is less than the extreme maximum setting the seat position equal to the predetermined extreme minimum and then setting the current second endstop limit value equal to the seat position.

* * * * *